July 28, 1959 — M. BODNARUK — 2,896,968
SAFETY SHIELD FOR VEHICLE WHEELS
Filed June 4, 1957
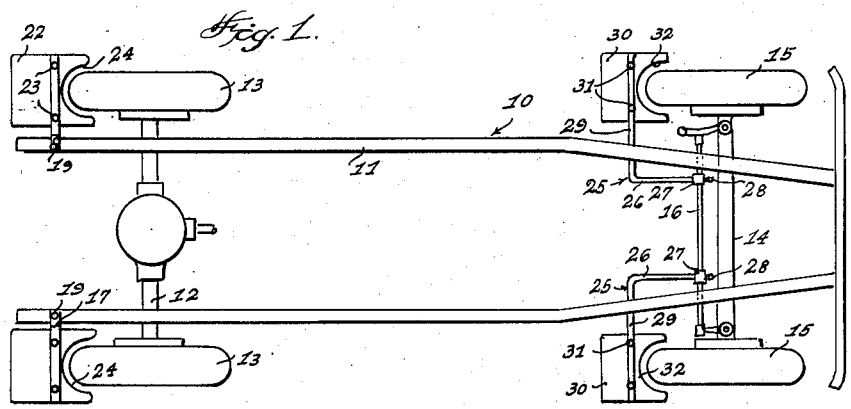
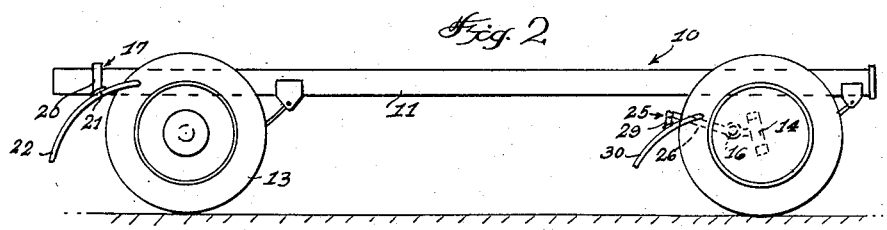
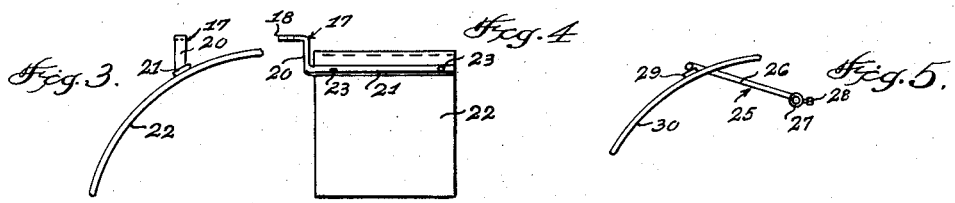
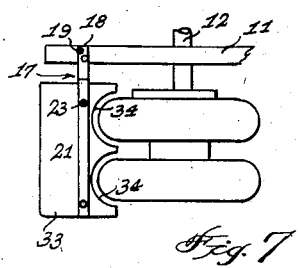
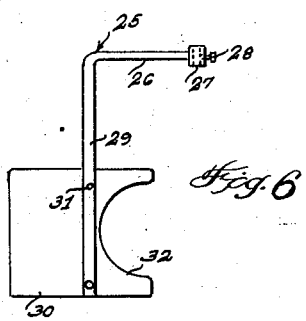
INVENTOR.
MATT BODNARUK
BY Victor J. Evans & Co.
ATTORNEYS United States Patent Office 2,896,968
Patented July 28, 1959

2,896,968

SAFETY SHIELD FOR VEHICLE WHEELS

Matt Bodnaruk, Battle Lake, Alberta, Canada

Application June 4, 1957, Serial No. 663,426

1 Claim. (Cl. 280—154.5)

This invention relates to a safety shield, and more particularly to a safety shield for mounting adjacent to the wheels of a vehicle.

The object of the invention is to provide safety shields which are adapted to be arranged contiguous to wheels of a vehicle whereby persons or vehicles to the rear of the vehicle having the safety shields thereon, will be protected from damage which results from gravel, rocks or other objects that may be thrown rearwardly by the wheels of the vehicle.

Another object of the invention is to provide safety shields which are adapted to be mounted on a vehicle and wherein all of the wheels of the vehicle will be equipped with the safety shields so that persons or vehicles which are behind the vehicle having the safety shields thereon, will not be damaged or harmed by rearwardly moving objects or foreign matter, the safety shields including rear members for coaction with the rear wheels of the vehicle, and wherein there is further provided front safety shields for coaction with the front wheels of the vehicle, the front safety shields being movable so that as the front wheels are steered or turned, the front safety shields will likewise be moved or shifted.

A further object of the invention is to provide a safety shield assembly for vehicle wheels, which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view showing the safety shields of the present invention mounted on the chassis of a vehicle.

Figure 2 is a side elevational view of the assembly shown in Figure 1.

Figure 3 is a side elevational view showing the safety shields for the rear wheel of the vehicle.

Figure 4 is a rear elevational view of the safety shields shown in Figure 3.

Figure 5 is a side elevational view showing one of the front safety shields.

Figure 6 is a plan view of the safety shield shown in Figure 5.

Figure 7 is a plan view showing a modification.

Referring in detail to the drawings, the numeral 10 indicates a portion of a vehicle which includes a chassis that has the usual spaced apart side bars 11, and extending transversely with respect to the rear portion of the side bars 11 is a rear axle 12 which has the usual rear wheels 13 thereon, Figures 1 and 2. There is further provided the usual front axle 14 which has the front wheels 15 thereon, and the vehicle further includes a conventional steering mechanism that embodies or includes a movable idler bar 16.

The present invention is directed to safety shields which are adapted to be arranged for coaction with the front and rear wheels 15 and 13 whereby rocks, gravel, or the like will be prevented from being thrown back by the wheels so that these rocks or gravel will not damage vehicles or persons which are arranged to the rear.

The numeral 17 indicates a bracket which is provided with a first portion 18 that is secured to the upper surface of the rear portion of the side bar 11 by suitable securing elements 19. Each bracket 17 further includes a second portion 20 which is arranged at right angles with respect to the first portion 18, and a third portion 21 is arranged at right angles with respect to the second portion 20. An arcuate shield or plate 22 is secured to the third portion 21 in any suitable manner, as for example by means of securing elements 23. The shield 22 is provided with an arcuate or curved recess 24 through which extends a portion of the rear wheel 13, and the shield 22 acts as a barrier for rocks or other material which may be thrown rearwardly by the wheels 13.

There is further provided support members or brackets which are indicated generally by the numeral 25, and each support member 25 includes a first section 26 that has a collar 27 secured thereto. The collars 27 are mounted on the movable idler bar 16, and these collars 27 have securing elements such as screw members or set screws 28 extending therethrough and into engagement with the idler bar 16. Thus, by loosening the set screws 28, the position of the collar 27 can be shifted as desired on the idler bar 16 so that the front shields 30 can be adjusted as desired.

Each support member 25 further includes a second section 29 which is arranged at right angles with respect to the first section 26, and the second section 29 is secured to the front shield 30 by means of suitable securing elements 31. The shield or plate 30 is provided with an arcuate recess 32 which provides clearance for the front wheel 15. In view of the fact that the support members 25 are connected to the movable idler bar 16 of the vehicle steering mechanism, it will be seen that as the wheels 15 are turned by the steering mechanism, the shields 30 will similarly be moved so as to prevent any jamming action between the shields 30 and front wheels 15 as the wheels are turned.

From the foregoing, it is apparent that there has been provided a means by which objects such as rocks, gravel, snow or the like will be prevented from being thrown rearwardly by the wheels of a vehicle as the vehicle is traveling along a roadway, highway, or the like. According to the present invention, a shield is arranged for coaction with each of the front and rear wheels 15 and 13 so that a barrier will be provided for each wheel. The front shields 30 are adapted to be secured in place by means of the support members 25, and the support members 25 include the sections 26 which have the collars 27 mounted on the movable idler arm 16. This construction insures that as the wheels 15 are turned, the front shields 30 will be similarly moved so as to insure that the front shields 30 travel or move with the front wheels 15 whereby the shields will function regardless of the position of the front wheels 15. The rear shields 22 are secured in place by means of the bracket 17, and the rear shields 22 are stationary with respect to the rear wheels 13 since the rear wheels 13 do not turn in the same manner as do the front wheels 15. The shields 22 and 30 each have a curved shape so as to provide an effective barrier for the rocks, gravel or the like, and the shields 22 are provided with curved recesses 24, while the shields 30 have the recesses 32, and these recesses permit the wheels to travel therethrough. Also, these recesses define portions which straddle opposite sides of the wheels so as to provide a further barrier against rearwardly thrown objects.

In Figure 7 there is shown the modified shield 33 which is provided with a plurality of recesses 34 whereby the shield 33 can be used with wheels 35 which may be mounted in tandem, as for example, when such wheels are mounted on trucks, trailers, buses or the like.

The shields may be lined with a suitable material such as a suitable plastic which has the purpose of tending to prevent adhesion of snow, mud or the like to the shield. As previously stated, the shield 33 can be used with double wheels 35. The shields are arranged with respect to the wheels so that stones or the like will be caught whereby damage to following vehicles, persons, or road users will be prevented, and the shields can be used with any types of vehicle, such as trucks, automobiles and the like. The shields extend downwardly and are curved so as to give the greatest possible protection. The parts can be made of any suitable material and in any different shapes or sizes. The brackets can be adjusted so that they can be readily attached to different portions of the vehicle. If desired, a shield such as the shield 33 can be provided with more than two recesses 34, as when the shield is being used in conjunction with more than two wheels.

The above description of the invention is for illustrative purposes only and it is understood that modifications may be made in the construction within the scope and spirit of the following claim.

I claim:

In a vehicle, a chassis including spaced apart side bars, a movable idler bar extending transversely with respect to the front portion of the side bars, said vehicle further including front and rear wheels, a bracket secured to the rear portion of each of said side bars and each bracket including a first portion secured to the upper surface of the side bar, a second portion extending downwardly from said first portion and arranged at right angles thereto, a third portion arranged at right angles to said second portion and said third portion being longer than said first and second portions, a curved shield secured to said third portion and said curved shield being provided with an arcuate recess for receiving a portion of the rear wheel therein, a pair of spaced apart support members each having a collar mounted on said idler bar, securing elements extending through said collars and into engagement with idler bar, said support member further including a first section extending rearwardly from said collar, a second section arranged at right angles to said first section, and a shield secured to said second section and provided with an arcuate recess for receiving a portion of the front wheel.

References Cited in the file of this patent

UNITED STATES PATENTS

| | | |
|---|---|---|
| 1,809,711 | Kile | June 9, 1931 |
| 2,124,513 | Bahr | July 19, 1938 |
| 2,461,044 | Ely | Feb. 8, 1949 |
| 2,652,266 | Miller | Sept. 15, 1953 |

FOREIGN PATENTS

| | | |
|---|---|---|
| 463,695 | France | Dec. 24, 1913 |
| 438,240 | Italy | Aug. 3, 1948 |
| 89,355 | Switzerland | May 16, 1921 |